United States Patent
Grzelak (10) Patent No.: US 9,860,264 B2
(45) Date of Patent: Jan. 2, 2018

(54) MULTI-DIMENSIONAL GEOMETRY FOR ENHANCEMENT OF SIMULATIONS OF NETWORK DEVICES

(71) Applicant: International Business Machines Corporation, Armonk, NY (US)

(72) Inventor: Cezar P. Grzelak, Saint John (CA)

(73) Assignee: International Business Machines Corporation, Armonk, NY (US)

( * ) Notice: Subject to any disclaimer, the term of this patent is extended or adjusted under 35 U.S.C. 154(b) by 234 days.

(21) Appl. No.: 14/580,272

(22) Filed: Dec. 23, 2014

(65) Prior Publication Data

US 2016/0182555 A1   Jun. 23, 2016

(51) Int. Cl.
*H04L 29/06* (2006.01)
*H04L 12/24* (2006.01)

(52) U.S. Cl.
CPC ...... *H04L 63/1433* (2013.01); *H04L 63/0263* (2013.01); *H04L 63/101* (2013.01); *H04L 63/20* (2013.01)

(58) Field of Classification Search
CPC . H04L 63/1433; H04L 63/0263; H04L 63/20; H04L 63/101
USPC ................................ 726/11–13, 25
See application file for complete search history.

(56) References Cited

U.S. PATENT DOCUMENTS

| | | | | |
|---|---|---|---|---|
| 6,058,260 A * | 5/2000 | Brockel | .............. | H04W 84/042 703/13 |
| 6,282,546 B1 * | 8/2001 | Gleichauf | ......... | G06F 17/30516 707/957 |
| 6,341,130 B1 | 1/2002 | Lakshman et al. | | |
| 6,816,973 B1 | 11/2004 | Gleichauf et al. | | |
| 7,433,304 B1 * | 10/2008 | Galloway | ........... | H04L 12/5695 370/229 |

(Continued)

OTHER PUBLICATIONS

Jong-Young Koh et al, Knowledge-Based Modelling and Simulation of Network Access Control Mechanisms Representing Security Policies, pp. 374-385, Springer-Verlag, 2002.*

(Continued)

*Primary Examiner* — Shanto M Abedin
(74) *Attorney, Agent, or Firm* — Michael O'Keefe (57) ABSTRACT

A computer-implemented method for using multi-dimensional geometry in simulations of packet flows through network devices, is provided. The computer-implemented method includes receiving an input object for traffic simulation of network devices, comprising a source and destination host ranges and source and destination port ranges, and protocol, application and vulnerability ranges, targeted for the destination host ranges. The computer-implemented method further includes representing blocked traffic of the simulated traffic by an intersection of at least two n-dimensional cuboids in n-dimensional space. The computer-implemented method further includes subtracting an access control list shape from an input shape to obtain a concave form representing permitted host, port, protocol, application, and vulnerability combinations of ranges. The computer-implemented method further includes decomposing the obtained concave shape into multiple convex shapes that satisfy a set of predetermined input conditions.

5 Claims, 4 Drawing Sheets

(56) References Cited

U.S. PATENT DOCUMENTS

| | | | |
|---|---|---|---|
| 7,636,937 B1* | 12/2009 | Bhattacharya | G06F 21/604 |
| | | | 709/223 |
| 8,615,008 B2* | 12/2013 | Natarajan | H04L 43/026 |
| | | | 370/389 |
| 8,750,285 B2 | 6/2014 | Paddon et al. | |
| 9,335,889 B2 | 5/2016 | Tan et al. | |
| 2004/0260818 A1* | 12/2004 | Valois | H04L 41/0856 |
| | | | 709/229 |
| 2006/0026682 A1 | 2/2006 | Zakas | |
| 2010/0110932 A1 | 5/2010 | Doran et al. | |
| 2010/0199346 A1* | 8/2010 | Ling | H04L 63/0263 |
| | | | 726/12 |
| 2011/0283348 A1* | 11/2011 | Ling | H04L 63/0263 |
| | | | 726/11 |
| 2013/0246924 A1* | 9/2013 | Tan | G06F 3/04815 |
| | | | 715/736 |
| 2014/0164595 A1 | 6/2014 | Bray et al. | |

OTHER PUBLICATIONS

Grace Period Disclosure Release memorandum—RFA 5995—Revision 3—Apr. 10, 2014 (IBM Guide 28.07), pp. 1-2.

Grace Period Disclosure "IBM Security QRadar V7.2.2 family delivers new capabilities and adds IBM <font color="RED"> Security QRadar Incident Forensics V7.2.2, IBM Security QRadar Packet Capture V7.2.2 and IBM Security QRadar Data Node V7.2.2 </font>", pp. 1-48, dated Apr. 10, 2014.

IBM: List of IBM Patents or Patent Applications Treated as Related (Appendix P), Jun. 3, 2015, pp. 1-2.

Pending U.S. Appl. No. 14/728,161, filed Jun. 2, 2015, entitled "Multi-Dimensional Geometry for Enhancement of Simulations of Network Devices", pp. 1-24.

* cited by examiner

MULTI-DIMENSIONAL GEOMETRY FOR ENHANCEMENT OF SIMULATIONS OF NETWORK DEVICES

STATEMENT REGARDING PRIOR DISCLOSURES BY THE INVENTOR OR A JOINT INVENTOR

Aspects of the present invention have been disclosed by the Applicant, who obtained the subject matter disclosed directly from the inventors, in the product IBM Security QRadar V7.2.2 family delivers new capabilities, pp. 1-48, dated Apr. 10, 2014.

BACKGROUND

The present invention relates to network computing security, and more particularly to usage of dimensional geometry in simulations of network computer security. An access control list (ACL) is a table that informs a computer operating system which access rights each user of network computing devices, of the computer operating system has to a particular system object, such as, a file directory or individual file. Each object has a security attribute that identifies its access control list. The list has an entry for each system user with access privileges of the network computing devices. The most common privileges include the ability to read a file, or all the files in a directory, to write to the file or files, and to execute the file, if it is an executable file, or program. Microsoft® Windows NT/2000 (Microsoft and all Microsoft—trademarks and logos are trademarks or registered trademarks of Microsoft, Inc. and/or its affiliates), Novell® NetWare (Novell and all Novell—trademarks and logos are trademarks or registered trademarks of Novell, Inc. and/or its affiliates), based systems are among the operating systems that use ACL for granting access network computing devices.

SUMMARY

According to an embodiment, a computer-implemented method for using multi-dimensional geometry in simulations of packet flows through network devices, is provided. The computer-implemented method includes receiving an input object for traffic simulation of network devices, comprising a source and destination host ranges and source and destination port ranges, and protocol, application and vulnerability ranges, targeted for the destination host ranges, wherein the traffic simulation is filtered by access control lists and routing tables of the network devices. The computer-implemented method further includes representing blocked traffic of the simulated traffic by an intersection of at least two n-dimensional cuboids in n-dimensional space. The computer-implemented method further includes subtracting an access control list shape from an input shape to obtain a concave form representing permitted host, port, protocol, application, and vulnerability combinations of ranges, based on the input object and access control list rules and route tables. The computer-implemented method further includes decomposing the obtained concave shape into multiple convex shapes, each representing a single set of the host, port, protocol, application and vulnerability ranges that satisfy a set of predetermined input conditions.

According to another embodiment, a computer system for using multi-dimensional geometry in simulations of packet flows through network devices, is provided. The computer system includes one or more processors, one or more computer-readable memories, one or more computer-readable tangible storage devices and program instructions which are stored on at least one of the one or more storage devices for execution by at least one of the one or more processors via at least one of the one or more memories. The computer system further includes program instructions to receive an input object for traffic simulation of network devices, comprising a source and destination host ranges and source and destination port ranges, and protocol, application and vulnerability ranges, targeted for the destination host ranges, wherein the traffic simulation is filtered by access control lists and routing tables of the network devices. The computer system further includes program instructions to represent blocked traffic of the simulated traffic by an intersection of at least two n-dimensional cuboids in n-dimensional space. The computer system further includes program instructions to subtract an access control list shape from an input shape to obtain a concave form representing permitted host, port, protocol, application, and vulnerability combinations of ranges, based on the input object and access control list rules and route tables. The computer system further includes program instructions to decompose the obtained concave shape into multiple convex shapes, each representing a single set of the host, port, protocol, application and vulnerability ranges that satisfy a set of predetermined input conditions.

According to yet another embodiment, a computer program product for using multi-dimensional geometry in simulations of packet flows through network devices, is provided. The computer program product includes one or more computer-readable tangible storage devices and program instructions stored on at least one of the one or more storage devices. The computer program product further includes program instructions to receive an input object for traffic simulation of network devices, comprising a source and destination host ranges and source and destination port ranges, and protocol, application and vulnerability ranges, targeted for the destination host ranges, whereby the traffic simulation is filtered by access control lists and routing tables of the network devices. The computer program product further includes program instructions to represent blocked traffic of the simulated traffic by an intersection of at least two n-dimensional cuboids in n-dimensional space. The computer program product further includes program instructions to subtract an access control list shape from an input shape to obtain a concave form representing permitted host, port, protocol, application, and vulnerability combinations of ranges, based on the input object and access control list rules and route tables. The computer program product further includes program instructions to decompose the obtained concave shape into multiple convex shapes, each representing a single set of the host, port, protocol, application and vulnerability ranges that satisfy a set of predetermined input conditions.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

Simulating the way network computing devices conduct rule evaluations, such as, access control list (ACL) rules, for large ranges of transmission control program/Internet protocol (TCP/IP), ports, or protocol groups, for accessing the network computing devices, can be an overwhelming task. A number of algorithms have been developed to accelerate ACL rules processing for granting permissions for accessing the network computing devices, but those algorithms are tailored to the problem of matching a single packet to an ACL rule, and as such, they do not deal with matching TCP/IP, ports, or protocol groups ranges. Therefore, it would be advantageous to provide a system for simplifying network simulations for accessing network computing devices, by representing simulation inputs, as well as, ACL rules, as multi-dimensional shapes, in simulation of network computing devices.

Consider, for example, if a query input to a firewall simulator, of the network computing devices requires process of a certain range of hosts computing devices, communicating over a range of destination ports, on certain protocols, the query input can be modelled as a three dimensional shape, whereby, each range criteria corresponds to one dimension. In this example, the dimensions may be: destination IP addresses, destination port numbers and communication protocols. The query input can be represented as a shape in N dimensions, likewise all firewall ACL rules, NAT translation rules, or IPS rules and even device routes, can be represented as multi-dimensional shapes in the same problem space. Therefore, an algorithm to determine how network rules filter an input query can then be reduced to relatively simple geometric operations, such as, intersecting, combining, or removing parts of multi-dimensional shapes for simplifying access simulations of the network computing devices, according to embodiments.

Embodiments of the present invention relate to network computing security, and more particularly to usage of dimensional geometry in simulations of network computer security. The embodiments include one or more circuits, or subassemblies of circuits, as well as, a system, or computer-implemented methods of operation for simplifying network simulations by representing simulation inputs, as well as, ACL rules, for accessing, a network computing system, as multi-dimensional shapes in the problem space defined by parameters of for accessing the network computing system.

Consider, for example, an input object that contains a destination host range from IP 10.100.100.0 to IP 10.100.100.100. The range of destination ports targeted for this IP range is from 100 to 220. Now if this simulated traffic is filtered by an ACL deny rule that is defined by a destination IP range of 10.100.100.60 to 10.100.100.255 and the port range of 200 to 280, then blocked traffic can be represented by an intersection of two rectangles in 2D space.

Thereafter, subtracting the ACL shape from the input shape yields a concave form that represents the permitted host/port combinations given the simulated input and the ACL rule. As such, a section of the input rectangle is missing which is that portion of the input blocked by the ACL. This 2D operation provides filtering logic of an ACL rule given a complex input. This can be easily extended to more than two dimensions. Because in most cases ACL rules are governed by simple ranges, the intersection operations can be performed easily and quickly as all lines remain perpendicular to each other.

The resulting shape, is a concave shape, which means that while it can be used to evaluate whether a single point (one host communicating on a single port) lies within its boundaries, it cannot be used to express which IP range/port range combinations are allowed unless the shape is decomposed into multiple convex (in this case rectangular) shapes each representing a single set of host/port ranges.

The model of simulating ACL evaluations can be extended to other simulated network activities such as routing or network address translation (NAT) translations. For example, routing can also be implemented as subdividing the query shape using an intersection line or an intersection plane. NAT translations can be implemented as translations and/or morphing of a shape in the modelled problem space. Therefore, at every stage of a network simulation, a resulting shape can be fed to a subsequent stage to perform more geometric operations which correspond to actual network device actions.

The present invention may be a system, a method, and/or a computer program product. The computer program product may include a computer readable storage medium (or media) having computer readable program instructions thereon for causing a processor to carry out aspects of the present invention.

The computer readable storage medium may be a tangible device that may retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein may be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages.

The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, may be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer readable program instructions may also be stored in a computer readable storage medium that may direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks. The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which includes one or more executable instructions for implementing the specified logical function(s). In some alternative implementations, the functions noted in the block may occur out of the order noted in the figures.

For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts or carry out combinations of special purpose hardware and computer instructions.

Figure 1:
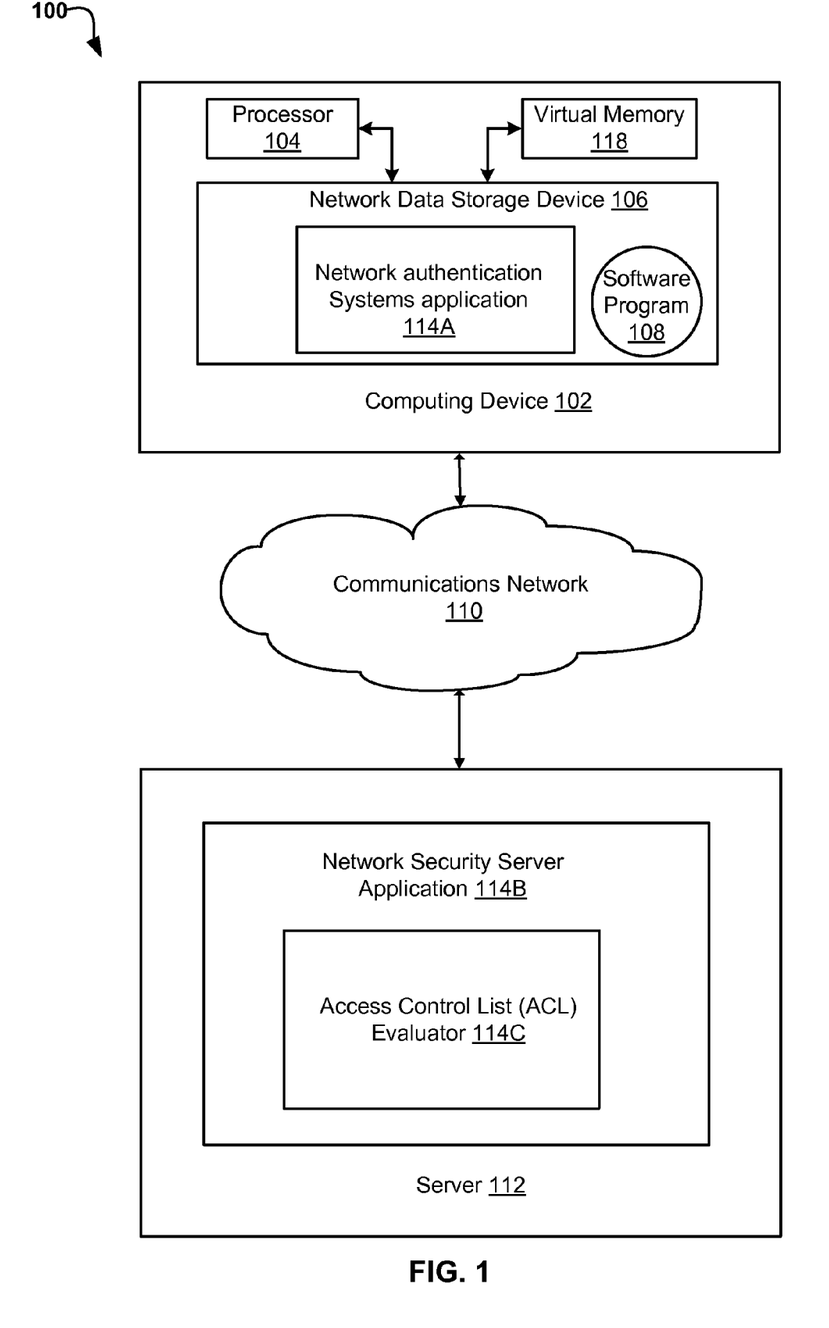
FIG. 1 illustrates a networked computer environment according to one embodiment.

The embodiments will now be described in detail with reference to the accompanying Figures. Referring to FIG. 1, network security simulation system 100, for accessing, a network computing system, of the network security simulation system 100, based on usage of multi-dimensional shapes to simplify simulations, defined by network parameters, for accessing the network computing system, according to embodiments, is depicted.

For example, in the illustrated environment, the network security simulation system 100 may include a computing device 102 with a processor 104, a network data storage device 106, and virtual memory 118 which is enabled to run, or execute program instructions of a software program 108. The computing device 102 may include a network authentication systems application 114A, for authenticating a client, or system, for accessing the computing device, by using multi-dimensional shapes to simplify simulations for accessing the network computing system, according to embodiments.

The network security simulation system 100 may also include a server 112, running a network security server application 114B, and interconnected with the computing device 102, over network security simulation system 100, for using multi-dimensional shapes to simplify simulations for accessing the server 112 of the network computing system 100, according to embodiments. The network security server application 114B includes access control rule (ACL) evaluator 114C, which is enable to deliver, operate, and secure, personalized applications to computing device 102, for simulating access to server 112. The ACL rule uses multi-dimensional shapes to simplify simulations for accessing the server 112 of the network computing system 100. The network computing system 100 may also include a plurality of computing devices 102 and servers 112, only one of which is shown, at least in FIG. 1.

The virtual mobile memory 118 may comprise, for example, one or more computer-readable storage media, which may include random-access memory (RAM) such as various forms of dynamic RAM (DRAM), e.g., DDR2 SDRAM, or static RAM (SRAM), flash memory, or any other form of fixed or removable mobile computing storage medium that may be used to carry or store desired program code and program data in the form of instructions or data structures and that may be accessed by other components of computing device 102, for authenticating a client, or system, for accessing the a network computing device, by using multi-dimensional shapes to simplify simulations for accessing the network computing system.

The communications network 110 may include various types of communication networks, such as, a wide area network (WAN), local area network (LAN), a telecommunication network, a wireless network, a public switched network and/or a satellite network. It should be appreciated that FIG. 1 provides only an illustration of one implementation and does not imply any limitations with regard to the environments in which different embodiments may be implemented. Many modifications to the depicted environments may be made based on design and implementation requirements.

The computing device 102 may communicate with the network security server application 114B, running on server 112, via the communications network 110, for using multi-dimensional shapes to simplify simulations for accessing the server 112 of the network computing system 100. The communications network 110 may also include connections, such as wire, wireless communication links, or fiber optic cables. As will be discussed with reference to FIG. 4, mobile server 112 may include internal components 800a and external components 900a, respectively, and computer 102 may include internal components 800b and external components 900b, respectively.

The computing device 102 may be any portable device that provides computing, information storage and, computing retrieval capabilities, including, for example, a handheld device, or handheld computer, pocket PC, connected organizer, electronic book (eBook) reader, a personal digital assistant (PDA), a smart phone, or other portable devices, or any type of computing devices capable of accessing a network for providing a virtualized mobile framework for displaying representations of charts of swatches of legends, based on client preferences of the mobile computing device 102, in accordance with embodiments. The computing device 102 may also be laptop, tablet, or notebook personal computer (PC), a desktop computer, a mainframe or mini computer, or a personal digital assistant (PDA).

The data storage device 106 of the computing device 102 is any type of storage device, storage server, storage area network, redundant array of independent discs (RAID), cloud storage service, or any type of data storage. The data storage device 106 may also be a relational model database server for storing network security program instructions for authenticating a client, or system, for accessing a network computing device, by using multi-dimensional shapes to simplify simulations for accessing the network computing system, according to embodiments.

The server 112 may be, for example, a server computer system such as a management server, a web server, or any other electronic device or computing system capable of receiving and sending data, including, for using multi-dimensional shapes to simplify simulations for accessing the server 112 of the network computing system 100. Further, the server 112 may also represent a "cloud" of computers interconnected by one or more networks, whereby the server 112 may be a primary server for a computing system utilizing clustered computers when accessed through the communications network 110. A cloud computing system may be an implementation of a system for using multi-dimensional shapes to simplify simulations for accessing the server 112. A network access repository of server 112 is any type of storage device, storage server, storage area network, redundant array of independent discs (RAID), cloud storage service, or any type of data storage for storing information relating to utilization of multi-geometry in simulations of networks of devices for representing input traffic, such as, destination host and post ranges, of computing device, for accessing, server 112, by using geometrical shapes and representing blocked traffic intersection of the geometrical shapes.

Figure 2:
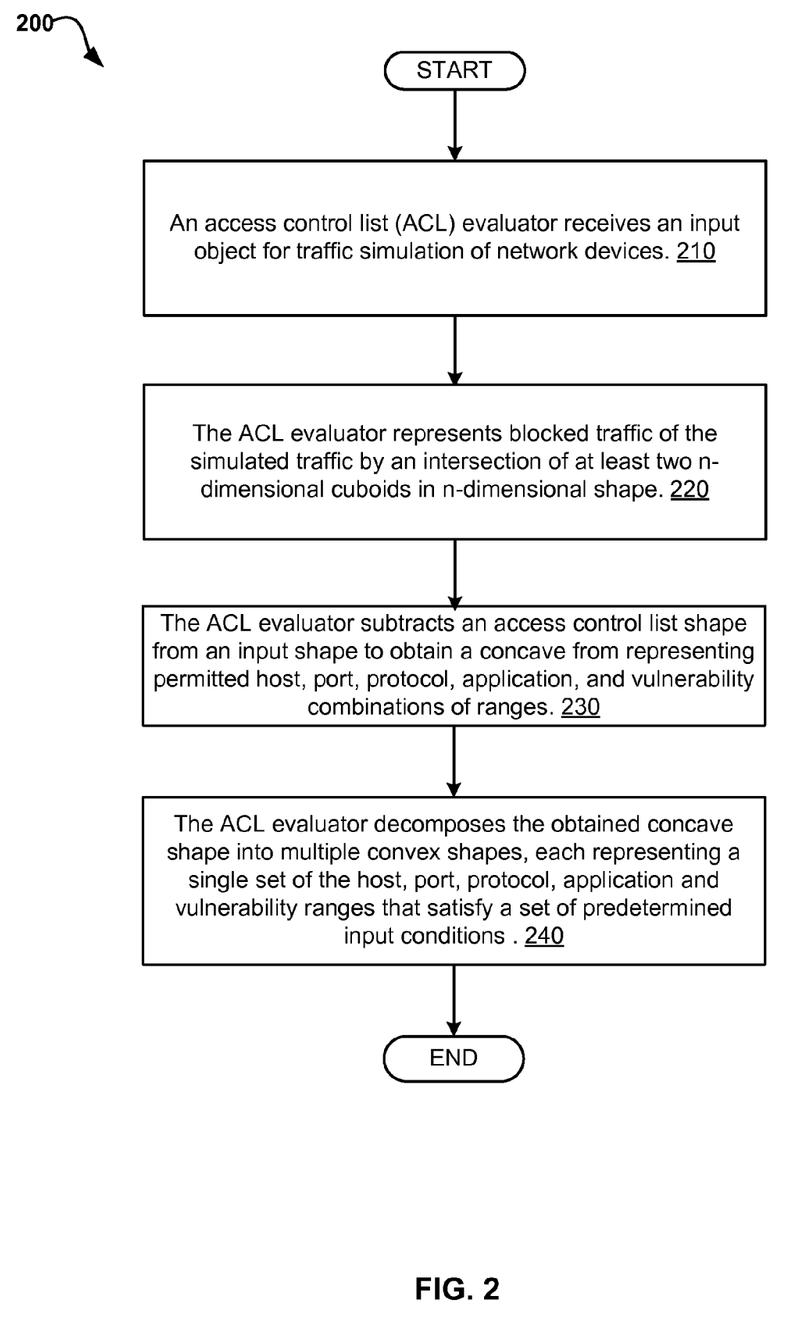
FIG. 2 illustrates operational flowchart illustrating steps carried out by access control rule (ACL) evaluator, for using multi-dimensional geometry in simulations of packet flows through network devices, according to at least one embodiment.

Referring now to FIG. 2, an operational flowchart 200 illustrating steps carried out by access control rule (ACL) evaluator 114C, for using multi-dimensional geometry in simulations of packet flows through network devices, for accessing server 112 via network authentication systems application 114A of computing device 102, according to embodiments. At step 210, the ACL evaluator 114C receives an input object for traffic simulation for accessing server 112 via network authentication systems application 114A of computing device 102, such as, source and destination host ranges and source and destination port ranges, and protocol, application and vulnerability ranges, targeted for the destination host ranges, wherein the traffic simulation is filtered by access control lists and routing tables of the network devices.

For example, the input object, received by the ACL evaluator 114C defines an input cuboid, whereby, a section of at least two cuboids of the input object is missing during the traffic simulation of the network devices for accessing server 112 via network authentication systems application 114A of computing device 102, and whereby, the missing at least two cuboids of the simulated traffic is blocked by the access control list, according to embodiments.

At step 220, the ACL evaluator 114C represents blocked traffic of the simulated traffic by an intersection of at least two n-dimensional cuboids in n-dimensional space. At step 230, the ACL evaluator 114C subtracts an access control list shape from an input shape to obtain a concave form representing permitted host, port, protocol, application, and vulnerability combinations of ranges, based on the input object and access control list rules and route tables. At step 240, the ACL evaluator 114C decomposes the obtained concave shape into multiple convex shapes, each representing a single set of the host, port, protocol, application and vulnerability ranges that satisfy a set of predetermined input conditions. The decomposed concave shape represents a single set of host, port, application, protocol and vulnerability ranges, according to embodiments.

Figure 3:
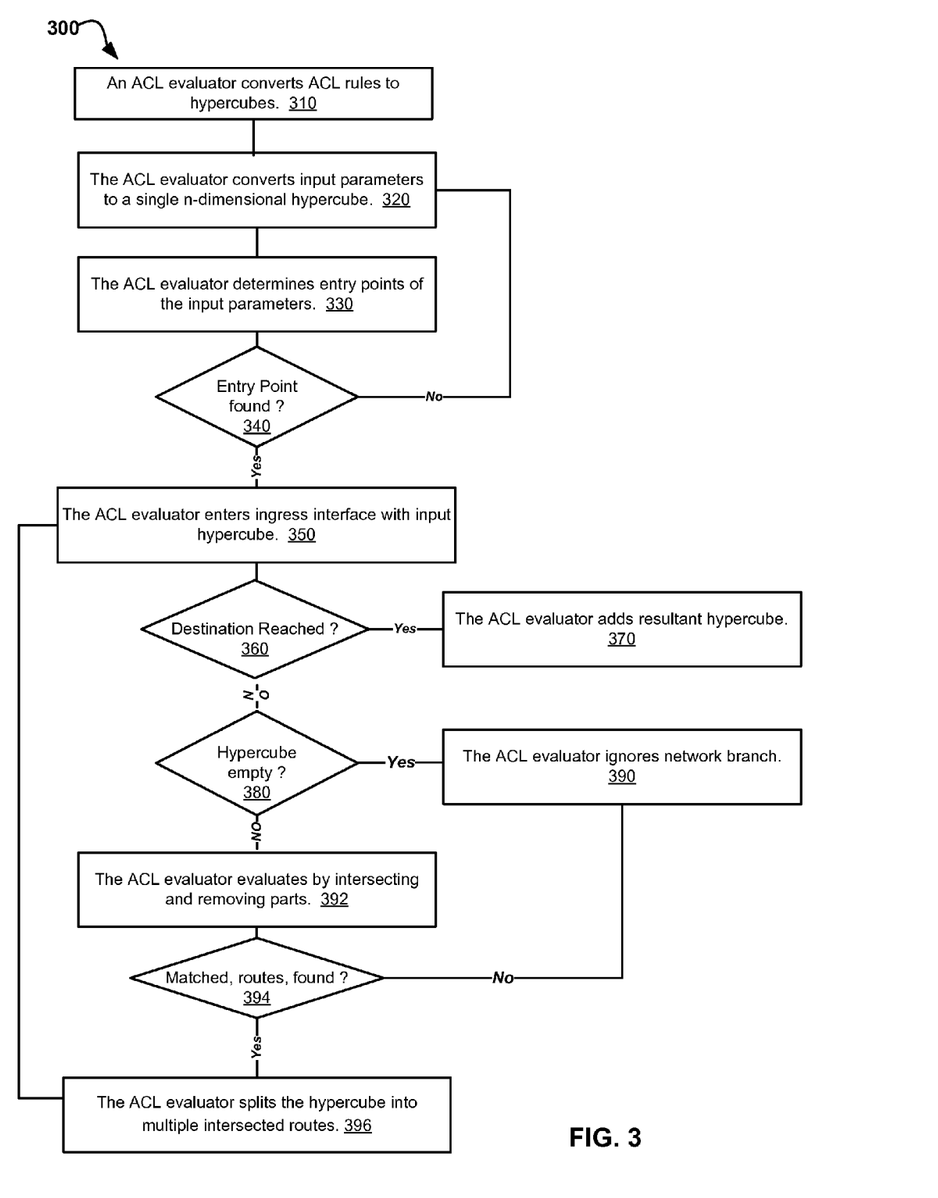
FIG. 3 illustrates an operational flowchart for applying multidimensional geometry for evaluating network attack paths, according to at least one embodiment.

Referring now to FIG. 3, an operational flowchart 300 illustrating steps carried out by access control rule (ACL) evaluator 114C, for applying multidimensional geometry for evaluating network attack paths, based on inputs for accessing server 112 via network authentication systems application 114A of computing device 102, is shown according to embodiments.

At step 310, ACL evaluator 114C (FIG. 1) converts authenticated access permissions of network authentication systems application 114A (FIG. 1), to n-dimensional hypercubes, intrusion prevention system (IPS), application firewall rules and network routes, for accessing server 112. The n-dimensional cuboid shape, or set of shapes, may be composed of a range or ranges of points on an axis representing a set of input criteria, or an aspect of a network, for accessing the server 112. For example, a range, or ranges of source ports would be considered a single dimension. A range of source IP addresses would be another dimension. A range of destination IP addresses would constitute yet another. The present invention may include other range dimensions.

At step 320, ACL evaluator 114C (FIG. 1) converts input parameters for accessing server 112, to a single n-dimensional hypercube. At step 330, ACL evaluator 114C determines entry point for accessing the server 112, by intersecting input cube of the hypercube with network interfaces of server 112. If an entry point is found, then, at step 340, the ACL evaluator 114C determines whether to enter into ingress interface with input hypercube intersected with 1 dimensional interface hypercube. If the ACL evaluator 114C enters ingress interface, then, at step 350, the ACL evaluator 114C enters ingress interface with hypercube.

However, if the ACL evaluator 114C does not enter ingress interface, then, at step 320, ACL evaluator 114C (FIG. 1) converts input parameters for accessing server 112, to a single n-dimensional hypercube. For example, for each entry point, the ACL evaluator 114C starts with a depth first traversal into the network of server 112. For each egress-ingress interface pair, the ACL evaluator 114C performs route and ACL evaluations by intersecting or removing parts of the input hypercube with hypercubes built from ACLs and routes. For example, the branching on egress interfaces, the ACL evaluator 114C performs hypercube intersections based on remainder of original input hypercube that is carried forward.

At decision 360, the ACL evaluator 114C determines whether all or part of the destination was reached. If all or part of the destination was reached, then, at step 370, the ACL evaluator 114C adds the resultant hypercube into a result hypercube. However, if all or part of the destination was not reached, then, at decision 380, the ACL evaluator 114C determines if the input hypercube was empty. If the ACL evaluator 114C determines that the input hypercube is empty, then, at step, 390, the ACL evaluator ignores network branch as no matching results were found. However, if the hypercube is not empty, then, at step 392, for egress-ingress interface pair, the ACL evaluator 114C performs route and ACL evaluations by intersecting and/or removing parts of inputs hypercube with hypercubes, built from ACL and routes. At decision 394, the ACL evaluator determines whether matching routes are encountered. If matching routes were determined, then at step 396, the ACL evaluator 114C splits the input hypercube into multiples, based on intersected routes of the network security simulation system 100. However, if no matching routes were determined, then at step 390, the ACL evaluator 114C ignores network branch as no matching results were found, according to embodiments.

Figure 4:
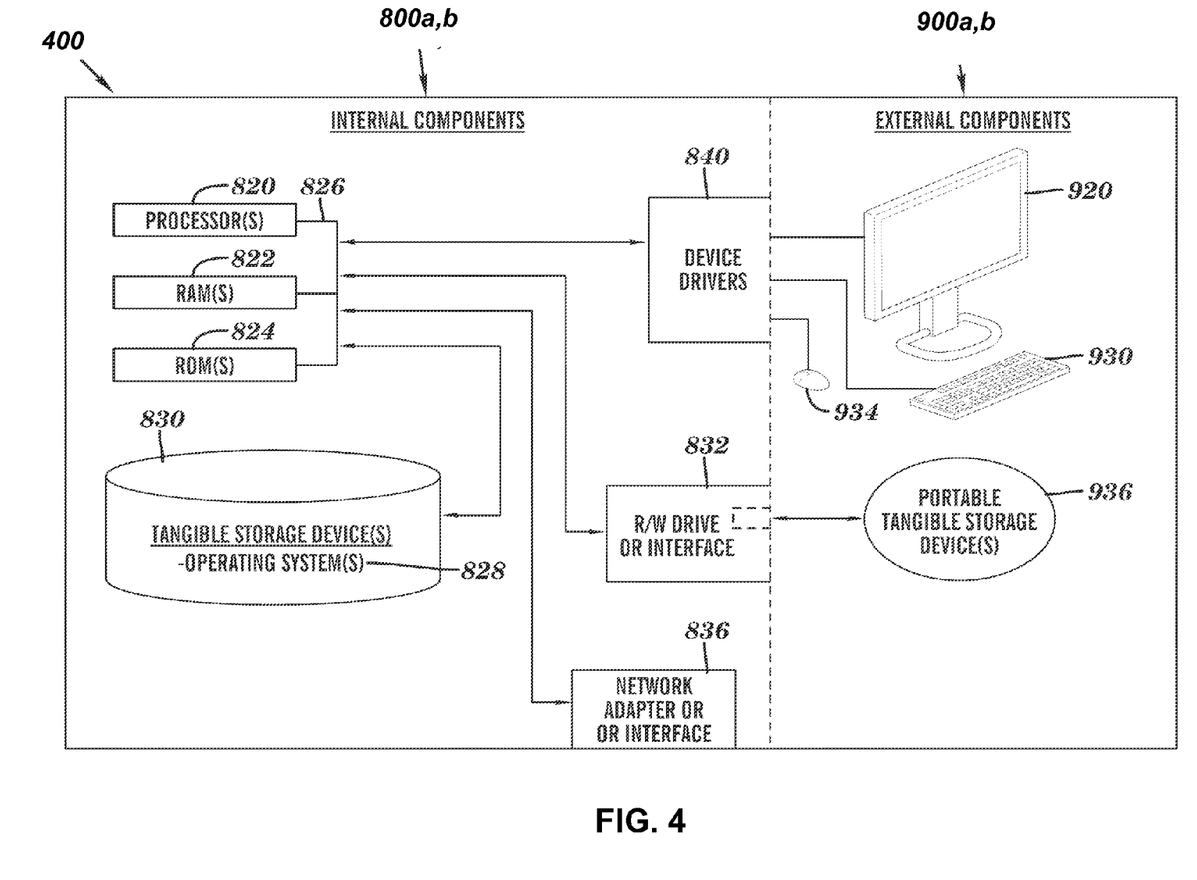
FIG. 4 is a block diagram of internal and external components of computers and servers depicted in FIG. 1 according to at least one embodiment.

FIG. 4 is a block diagram 400 of internal and external components of computers depicted in FIG. 1 in accordance with an illustrative embodiment. It should be appreciated that FIG. 4 provides only an illustration of one implementation and does not imply any limitations with regard to the environments in which different embodiments may be implemented. Many modifications to the depicted environments may be made based on design and implementation requirements.

Data processing system 800, 900 is representative of any electronic device capable of executing machine-readable program instructions. Data processing system 800, 900 may be representative of a smart phone, a computer system, PDA, or other electronic devices. Examples of computing systems, environments, and/or configurations that may be represented by data processing system 800, 900 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

Network authentication systems application 114A (FIG. 1), and access control list (ACL) evaluator 114B (FIG. 1) may include respective sets of internal components 800a, b and external components 900a, b illustrated in FIG. 4. Each of the sets of internal components 800a, b includes one or more processors 820, one or more computer-readable RAMs 822 and one or more computer-readable ROMs 824 on one or more buses 826, and one or more operating systems 828 and one or more computer-readable tangible storage devices 830. The one or more operating systems 828 and software programs 108 (FIG. 1) in computing device 102 (FIG. 1) is stored on one or more of the respective computer-readable tangible storage medium 830 for execution by one or more of the respective processors 820 via one or more of the respective RAMs 822 (which typically include cache memory). In the embodiment illustrated in FIG. 4, each of the computer-readable tangible storage medium 830 is a magnetic disk storage device of an internal hard drive. Alternatively, each of the computer-readable tangible storage medium 830 is a semiconductor storage device such as ROM 824, EPROM, flash memory or any other computer-readable tangible storage device that can store a computer program and digital information.

Each set of internal components 800a, b also includes a R/W drive or interface 832 to read from and write to one or more portable computer-readable tangible storage medium 936 such as a CD-ROM, DVD, memory stick, magnetic tape, magnetic disk, optical disk or semiconductor storage device. A software program 108 (FIG. 1), such as network authentication systems application 114A (FIG. 1) can be stored on one or more of the respective portable computer-readable tangible storage medium 936, read via the respective R/W drive or interface 832 and loaded into the respective hard drive 830.

Each set of internal components 800a, b also includes network adapters or interfaces 836 such as a TCP/IP adapter cards, wireless Wi-Fi interface cards, or 3G or 4G wireless interface cards or other wired or wireless communication links. The software program 108 (FIG. 1) and the network authentication systems application 114A (FIG. 1), and the access control list (ACL) evaluator 114B (FIG. 1) can be downloaded to client computer 102 (FIG. 1) and server computer 112 (FIG. 1), respectively from an external computer via a network (for example, the Internet, a local area network or other, wide area network) and respective network adapters or interfaces 836. From the network adapters or interfaces 836, the code software programs 108 (FIG. 1) and the network authentication systems application 114A (FIG. 1), and access control list (ACL) evaluator 114B (FIG. 1)) are loaded into the respective hard drive 830. The network may comprise copper wires, optical fibers, wireless transmission, routers, firewalls, switches, gateway computers and/or edge servers.

Each of the sets of external components 900*a, b* can include a computer display monitor 920, a keyboard 930, and a computer mouse 934. External components 900*a, b* can also include touch screens, virtual keyboards, touch pads, pointing devices, and other human interface devices. Each of the sets of internal components 800*a, b* also includes device drivers 840 to interface to computer display monitor 920, keyboard 930 and computer mouse 934. The device drivers 840, R/W drive or interface 832 and network adapter or interface 836 comprise hardware and software (stored in storage device 830 and/or ROM 824).

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for using multi-dimensional geometry in simulations of packet flows through network devices, the computer-implemented method comprising:

receiving, by an access control list evaluator at a network security server application, an input object for traffic simulation of network devices from a network authentication systems application of a computing device, wherein the input object comprising a source and destination host ranges and source and destination port ranges, and protocol, application and vulnerability ranges, targeted for the destination host ranges, wherein the traffic simulation is filtered by access control lists and routing tables of the network devices, wherein a section of at least two cuboids of the input object is missing during the traffic simulation of the network devices, and wherein the missing section of the at least two cuboids of the simulated traffic is blocked by the access control list;

representing, by the access control list evaluator, blocked traffic of the simulated traffic by an intersection of at least two n-dimensional cuboids in n-dimensional space;

subtracting, by the access control list evaluator, an access control list shape from an input shape to obtain a concave form representing permitted host, port, protocol, application, and vulnerability combinations of ranges, based on the input object and access control list rules and route tables, wherein the input shape yields a concave form that represents the permitted host, port, protocol, application, and vulnerability combinations of ranges, based on the traffic simulated input; and decomposing, by the access control list evaluator, the obtained concave shape into multiple convex shapes, each representing a single set of the host, port, protocol, application and vulnerability ranges that satisfy a set of predetermined input conditions.

2. The computer-implemented method of claim 1, wherein the input object defines an input cuboid.

3. The computer-implemented method of claim 1, wherein the decomposed concave shape represents a single set of host, port, application, protocol and vulnerability ranges.

4. The computer-implemented method according to claim 1, wherein the access control list deny rule is a table that updates the network devices with access permissions, or grants, for accessing network resources of the network devices.

5. The computer-implemented method of claim 4, wherein the access control list deny rule is based on defined parameters for evaluating the access permissions or grants, for accessing the network device.

* * * * *